United States Patent [19]
Cormouls-Houles

[11] Patent Number: 5,702,751
[45] Date of Patent: Dec. 30, 1997

[54] PROCESS AND INSTALLATION FOR ROASTING FRUITS OR NUTS

[75] Inventor: Jacky Cormouls-Houles, Toulouse, France

[73] Assignee: Societe Civile Chenier, Toulouse, France

[21] Appl. No.: 663,228

[22] PCT Filed: Dec. 15, 1994

[86] PCT No.: PCT/FR94/01473

§ 371 Date: Jun. 17, 1996

§ 102(e) Date: Jun. 17, 1996

[87] PCT Pub. No.: WO95/16365

PCT Pub. Date: Jun. 22, 1995

[30] Foreign Application Priority Data

Dec. 15, 1993 [FR] France ............................... 93 15320

[51] Int. Cl.⁶ ......................... A23L 1/38; A47J 37/08
[52] U.S. Cl. ................... 426/629; 426/520; 426/632; 426/634; 426/615; 99/386; 99/357; 99/443 C
[58] Field of Search ......................... 426/520, 632, 426/634, 615, 629; 99/357, 386, 443 C, 127

[56] References Cited

U.S. PATENT DOCUMENTS

| | | |
|---|---|---|
| 1,872,456 | 8/1932 | Kelly. |
| 3,528,362 | 9/1970 | Arnold, Jr.. |
| 4,938,987 | 7/1990 | Gannis et al.. |
| 5,595,780 | 1/1997 | Zook ........................ 426/632 |

FOREIGN PATENT DOCUMENTS 61-177968  8/1986  Japan ..................... 426/632

*Primary Examiner*—Deborah Yee
*Attorney, Agent, or Firm*—Young & Thompson

[57] ABSTRACT

The invention provides a roasting process for the preparation of fruit or nuts such as almonds, cashew nuts, pecan nuts, peanuts; and the like. This process is characterized by the addition of oil to said fruit or nuts prior to the roasting stage. The invention also provides an equipment for applying this process, which essentially comprises feeding means (1) for the fruit or nuts to be roasted and conveying means (2) for carrying said fruit towards roasting means (3), said equipment being characterized in that it also includes oil and salt dispensing means (6, 7) at the inlet of the roasting means.

9 Claims, 1 Drawing Sheet

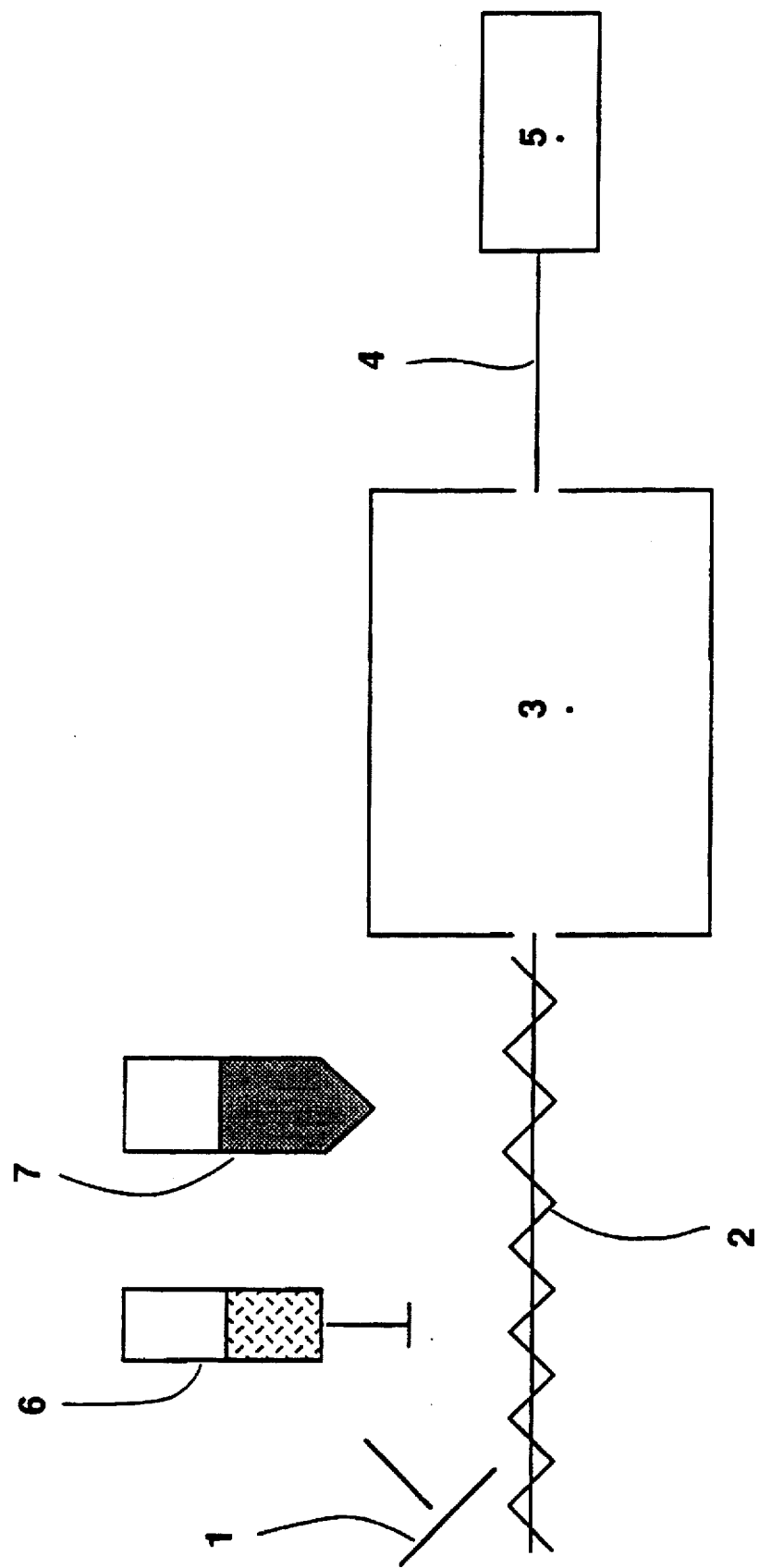

PROCESS AND INSTALLATION FOR ROASTING FRUITS OR NUTS

BACKGROUND OF THE INVENTION

1. Field of the Invention

The present invention relates to the agro-food industry and more particularly to techniques for the preparation by roasting of fruits or seeds of the type of almonds, cashew nuts, pecans or the like, to render them fit for consumption. Products of this nature are generally used as human food as an accompaniment for aperitive beverages or are part of the composition of certain culinary preparations.

2. Description of the Prior Art

For several years now, consumers, alerted particularly by nutritionists, tend to direct their choice toward so-called "light" products, having principally a low fat content but which nevertheless maintain their organoleptic properties. Edible seeds of the type of almonds, cashew nuts, pecan nuts, peanuts or the like, notable for being naturally very rich in fatty and glucidic substances, are thus the more often listed as foodstuffs to be avoided.

Moreover, the conventional techniques of preparation of these products consists generally in immersing the seeds in baths of hot oil, which is used several times, and which gives rise to the formation particularly of oxidized triglycerides in a high proportion.

SUMMARY OF THE INVENTION

The invention has for its object a process for the production by roasting of fruits or seeds belonging to this category, which permits particularly obtaining a product which is lighter, which is to say substantially less fatty and whose taste qualities will be maintained or even improved.

BRIEF DESCRIPTION OF THE DRAWING

The FIGURE shows a schematic of a preferred installation for practicing the present process.

DESCRIPTION OF THE PREFERRED EMBODIMENTS

A process according to the invention for roasting fruits and seeds having low water content including almonds, cashew nuts, pecan nuts, and peanuts has the following steps. First, the fruits and seeds to be roasted are coated with edible oil. Second, at least salt as a seasoning substance is added to the oil-coated fruits and seeds. Lastly, the fruits and seeds are roasted.

The invention relates to a process for the production by roasting of fruits or seeds of the type of almonds, cashew nuts, pecan nuts, peanuts or the like, consisting in adding to the fruits or seeds salt and if desired other seasoning substances, before subjecting them to the roasting phase, this process being notable in that it consists in adding also to the fruits or seeds edible oil before the roasting phase.

The fruits or seeds are thus simply sprayed with cold oil, i.e., with an oil at ambient temperature, and not immersed in a hot bath as in the earlier technique.

According to other known techniques, the roasting is conducted dry and oil is added only at the beginning of the cooling phase of the roasted product. This roasted product will then be, at the end of the treatment in question, covered entirely with a more or less thick coating of oil before being packaged in bags or boxes which renders them less agreeable to the touch during consumption. Moreover, not being protected during their passage through the oven, certain seeds can be carbonized, which translates into a substantial loss of starting material.

With the process of the invention, the addition of oil is effected before the roasting phase, which permits avoiding the above drawbacks and improving the "golden" appearance of the final product. Thus the oil, instead of stagnating on the surface of the seed, penetrates during cooking into the superficial layers of the product to form a brown colored crust which crunches agreeably between the teeth.

Another important advantage of the process of the invention resides in the fact that it permits thus limiting the quantity of oil used and hence reducing substantially the content of fatty material of the final product. Relative to the so-called "dry roasting" process, which requires the addition of about 10% of oil to the quantity of roasted nuts, the process of the invention requires only the initial supply of 8% of this oil of which a fraction is moreover naturally eliminated during cooking.

According to another advantageous characteristic of the process of the invention, the addition of salt and the addition of oil are effected separately, before the passage of the seeds to the oven, which permits modulating the respective quantities of these ingredients as a function of the nature of the product treated or of the result which it is desired to obtain.

The addition of salt and oil before roasting has the substantial advantage of improving the adhesion of the particles of salt to the surface of the nuts and thereby preventing a substantial quantity of salt from migrating to the bottom of the packaging bags as is often the case with products of the prior art.

It has also been observed that to obtain taste qualities at least comparable to those of products prepared according to the prior art, it is possible with the present invention to reduce substantially the quantities of salt used. By way of example, for a preparation of 4 tons of cashew nuts, one will use with the process of the invention 75 liters of vegetable oil and 60 kilograms of salt whose grains have dimensions of the order of 170μ.

According to other preferred aspects of the process of the invention, the roasting phase is carried out at a temperature not higher than 180° C., for about 5 minutes, whilst the prior art "dry roasting" requires a cooking temperature of at least 180° C. and a cooking time greater than 5 minutes.

The characteristics set forth above give rise to substantial savings of energy and time which, with the economies realized in the ingredients used, permit reducing substantially the price of the final product.

Studies conducted particularly on peanuts, have shown that the products obtained with the process of the invention contain a lesser quantity of benzopyrene than those prepared according to the conventional hot bath technique, with a reduced degree of acidity and better resistance to oxidation.

The invention also has for its object an installation permitting practicing the process which has been described.

The illustrated installation comprises conventionally a hopper 1 for supplying nuts which are poured by gravity on a conveyor 2 to be brought toward an oven 3. A cooling zone is adjacent the outlet of this oven, this zone being simply constituted by a belt conveyor 4 which conducts the roasted nuts toward a packaging station 5.

According to the principles of the invention described above, this installation comprises an oil distribution means 6 and a salt distribution means 7 disposed at the inlet of the oven 3 in association with the screw conveyor 2. Preferably, and as can be seen, this conveyor is constituted by a screw which permits agitating the nuts during their transportation and coating them intimating with oils and salt poured by the distribution means 6 and 7.

It will moreover be noted that during their transportation toward the oven 3, the fruits or nuts will naturally lose the excess oil which covers them, by simple draining.

The oil distribution means is, in the illustrated example, simply comprised by a reservoir provided with a spray manifold, the salt distribution means being itself comprised of a receptacle provided with a pneumatic pulverization device.

I claim:

1. A process for roasting fruits or seeds having low water content, said process comprising the steps of:

coating fruits or seeds to be roasted with edible oil;

adding at least salt as a seasoning substance to said oil-coated fruits or seeds; and then roasting said salted, oil-coated fruits or seeds.

2. The process according to claim 1, characterized in that the oil is added at ambient temperature.

3. The process according to claim 1, characterized in that the oil is added in a proportion of 8% by volume of the fruits or seeds treated.

4. The process according to claim 1, characterized in that the addition of salt and the addition of oil are carried out separately.

5. The process according to claim 1, characterized in that the roasting phase is conducted at a temperature not higher than 180° C.

6. The process according to claim 5, characterized in that the roasting phase has a duration substantially equal to 5 minutes.

7. An installation for practicing a process for roasting fruits or seeds having low water content, the process comprising the steps of: coating the fruits or seeds to be roasted with edible oil; adding at least salt as a seasoning substance to the oil-coated fruits or seeds; and then roasting the salted, oil-coated fruits or seeds, said installation comprising:

supply means (1) for fruits or seeds to be roasted;

means (2) for conveying said fruits or seeds toward roasting means (3); and distribution means (6, 7) for said at least salt and said edible oil at an inlet of said roasting means, said distribution means having a reservoir with a spray manifold for oil distribution, said distribution means having a pneumatic pulverization device for salt distribution.

8. Installation according to claim 7, wherein said distribution means are associated with said conveying means.

9. Installation according to claim 8, wherein said conveying means comprise a screw conveyor (2).

* * * * *